United States Patent Office 3,718,617
Patented Feb. 27, 1973

3,718,617
MINIMUM IRRITATION POTENTIAL POTTING COMPOUND
Lewis M. Royal, Attleboro Falls, Mass., assignor to Texas Instruments Incorporated, Dallas, Tex.
No Drawing. Filed July 29, 1970, Ser. No. 59,355
Int. Cl. C08g 51/34
U.S. Cl. 260—30.4 ED          20 Claims

ABSTRACT OF THE DISCLOSURE

A minimum irritation potential potting compound is provided which cures into potting possessing the thermal shock resistance, dimensional stability, adhesiveness to soft metals, electrical resistivity and moisture resistance required for potting electrical devices such as, for example, tubular motor protectors. The potting compound cures at room temperature and prior to cure has a viscosity under flow conditions which is sufficiently low to facilitate application and a thixotropic index of between 2 and 3, high enough to prevent seepage and sagging. The novel potting formulation comprises a mixture of an alkyl glycidyl ether reactive diluent having alkyl chain lengths of between 12 and 14 carbon atoms and an amine-monofunctional glycidyl ether adduct curing agent formed by the reaction of two moles of a heterocyclic spiro diamine represented by the formula:

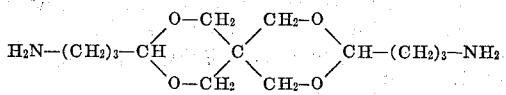

with one mole of butyl glycidyl ether, with a conventional glycidyl ether of bisphenol A, fillers, thixotropic materials and polar compounds. A novel low toxicity hardener composition comprising the above stated amine-glycidyl adduct and one or more ethylene oxide or propylene oxide adducts of diethylene triamine or triethylene tetramine is also provided, as is a method of preparing potting which involves minimum exposure of personnel to skin irritation.

---

This invention relates to epoxy resins and, more particularly, to minimum irritation potential epoxy resin formulations useful as electrical potting compounds.

Epoxy resins are in common use as the principal constituent of potting compounds for the protection, insulation and mechanical stabilization of electrical windings, switch leads, thermostatic elements and the like. Glycidyl ethers of bisphenol A may be cured by reaction with amines to produce potting of exceptional strength, durability, adhesiveness, dimensional stability and resistance to thermal shock. The sealing characteristics of such potting are outstanding.

An important use of potting compounds is for the end sealing of electrical elements such as tubular motor protectors. In the assembly of a tubular motor protector, the thermal element of a thermoswitch is placed inside a tube adjacent the closed end of the tube. A spacer, typically of ceramic material or molded thermoset plastic material, is normally inserted behind the thermoswitch and the open end of the tube is then sealed with potting through which the terminals for connection to the thermal overload control circuit protrude. The potting formulation is introduced into the end of the motor protector tube by various means, among the most advantageous of which is dispensation through a small bore needle. After the end of the tube is filled with the potting formulation, the formulation is cured to produce a hermetic seal in the end of the motor protector tube. By a hermetic seal is meant a seal effective to exclude any non gaseous substance.

For sealing of motor protectors or for any end sealing service, it is apparent that a potting formulation must be capable of substantial curing, in a reasonable period of time, at room temperature. Heating of the motor protector assembly increases the pressure of the air trapped in its forward end and this air will blow through potting which has not undergone a substantial cure.

There are numerous other criteria which a potting compound must meet if it is to be useful for end sealing of motor protectors or for similar purposes. In addition to electrical resistivity and moisture resistance, it must, for example, have sufficient rigidity so that the terminals which protrude through it cannot move under thermal stress, mechanical vibration or contact pressure. Any such movement is likely to be imparted to the thermal element or the stationary contact and destroy calibration of the thermal switch. On the other hand, the potting compound must be sufficiently flexible to hold up and maintain a seal under severe thermal shock. Inherent motor protectors are incorporated in the stator assembly of a motor. In the process of manufacture of the motor, varnish is applied to the stator assembly by immersion, immediately after a prebake of the stator at a temperature of approximateld 350° F. for about an hour. The end seal of the motor protector must be capable of absorbing the shock thus incurred, without losing its adhesive or cohesive integrity.

To maintain a hermetic seal, particularly under severe thermal shock conditions, the potting compound must adhere very strongly to the inside wall of the motor protector tube. A particular difficulty is presented in this regard by the tin plate with which the insides of many motor protector tubes are covered. Tin and other soft metals are quite difficult to bond to. Similar adhesion problems are also presented by certain harder metals such as nickel.

To facilitate the delivery of a potting formulation to a space to be potted, it is desirable that the potting formulation have a relatively low viscosity under flow conditions. Where, for example, the potting is to be dispensed through a small bore needle at high production rates, it is desirable that the potting formulation have a viscosity of about 3,500 to 4,000 centipoises under high shear conditions, at 25° C. On the other hand, to prevent seepage or leakage of the potting formulation through small apertures or cracks into areas of an electrical apparatus adjacent to the space to be potted, it is desirable that the viscosity at low shear be relatively high. Thus, a practically useful potting formulation should have a thixotropic index of 2 to 3.

Potting formulations have previously been developed which meet all of the above criteria. Such formulations have basically consisted of polyfunctional glycidyl ethers, a hardener, a thixotrope, a polar compound, and, usually, also a filler and pigment. To obtain the proper balance between rigidity and flexibility, two polyfunctional glycidyl ethers are typically incorporated, one an ether of bisphenol A having a relatively low weight per epoxide, to promote rigidity, and the other an aliphatic glycidyl ether having a relatively high weight per epoxide, e.g., 315 or higher, to impart a degree of flexibility.

The above described potting compounds have been in commercial use for some time and have provided quite satisfactory performance in essentially all respects, except one. The hardeners which have heretofore been found useful in end seal type potting formulations are all rather toxic materials which have caused widespread dermititis problems among those who must work with the formulations, particularly the operators who apply them to the device to be potted. Among the functionally effective but physiologically hazardous hardeners may be included the various aliphatic amines such as, for example, tetraethylene pentamine, monoethanolamine, diethanolamine, aminoethyl ethanolamine, diethylaminopropylamine and aminoethylpiperazine. The various modified polyamines which are commercially available also with few exceptions, fall into the same category. Some polyamides and hydroxyethylamines, so-called "safety hardeners," do exhibit low toxicity but cannot be satisfactorily used alone since they impart excessive rigidity to the potting. Those polyamides that do impart flexibility lose that property after high temperature exposure for a relatively short period of time. Also, polyamide hardeners are highly viscous and potting formulations prepared therefrom are very difficult and inconvenient to apply.

To assist in reducing the viscosity of potting formulations, particularly those with significant thixotropy, low viscosity reactive diluents are commonly incorporated therein. Typical of the reactive diluents conventionally employed are butyl glycidyl ether, phenyl glycidyl ether, cresyl glycidyl ether, allyl glycidyl ether, and styrene oxide. Although these are useful constituents which impart desirable working properties to potting formulations, all of these conventional reactive diluents are also quite toxic materials, and often give rise to serious skin irritation problems.

Prior to the present invention, therefore, no potting compound has been available which meets the exacting criteria required for an end sealant, end applications involving thermal shock, encapsulated air space, soft metal substrates and the like, while avoiding the physiological damage, lost production and potentially excessive costs associated with the toxic character of the compounds which have been used. A serious unfulfilled need has existed in the art for a potting compound which is both functionally satisfactory and relatively non-toxic.

Among the several objects of the present invention therefore may be noted the provision of a potting formulation which contains a minimum irritation potential (MIP) curing agent; the provision of a potting formulation which contains a MIP reactive diluent; the provision of a MIP potting formulation of appropriate viscosity and thixotropic index; the provision of a potting produced from a MIP potting formulation which has the proper degree of flexibility, dimensional stability, adhesiveness, and resistance to thermal shock; and the provision of methods of preparing potting of the desired character with minimum exposure of personnel to toxic conditions. Other objects and features will be in part apparent and in part pointed out hereinafter.

The present invention is thus directed to a low toxicity composition useful in the preparation of a potting composition which comprises a mixture of a glycidyl ether of bisphenol A having a viscosity not substantially higher than about 9,000 centipoises and a weight per epoxide of between about 160 and about 200, at least one reactive diluent selected from the group consisting of dodecyl, tridecyl, and tetradecyl glycidyl ethers, a polar compound and sufficient thixotropic material of the type compatible with epoxy resin systems to impart a thixotropic index of between about 2 and about 3 to an approximately stoichiometric mixture of the said composition with a curing agent therefor. The invention is further directed to a low toxicity curing agent useful in the curing of potting compounds which comprises a mixture of an amine-monofunctional glycidyl ether adduct formed by the reaction of two moles of a heterocyclic spiro diamine represented by the formula:

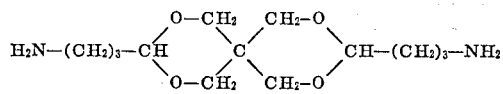

and the chemical name 3,9-bis (3-aminopropyl)-2,4,8,10-tetraspiro [5.5] undecane with one mole of butyl glycidyl ether and at least one compound selected from the group consisting of N-(2-phenyl-2-hydroxyethyl) diethylenetriamine, N-(hydroxyethyl) diethylenetriamine, N,N'-bis (hydroxyethyl) diethylenetriamine, N-(hydroxypropyl) diethylenetriamine, N,N'-bis (hydroxyethyl) triethylenetetramine, N,N'-bis (hydroxypropyl) diethylenetriamine, N,N' - tris (hydroxypropyl) diethylenetriamine, N,N'-tris (hydroxyethyl) diethylenetriamine and N-(2-hydroxyethyl - 2,4,4 - trimethylpentyl) diethylenetriamine. The invention also includes a cured potting compound which comprises a mixture of a thixotropic material of the type compatible with epoxy resin systems, a polar compound and the reaction product between a first composition of low toxicity containing a glycidyl ether of bisphenol A having a viscosity not higher than about 16,000 centipoises and a weight per epoxide of between 160 and about 200, and a second composition of low toxicity containing an amine-monofunctional glycidyl ether adduct formed by the reaction of two moles of a heterocyclic spiro diamine represented by the formula:

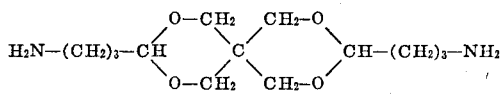

with one mole of butyl glycidyl ether. Additionally included in the invention is a method for preparing potting without substantial exposure of personnel to toxicity which comprises the steps of preparing a first composition by mixing a glycidyl ether of bisphenol A having a viscosity of not higher than about 16,000 centipoises and a weight per epoxide of between about 160 and 200, an alkyl glycidyl ether selected from the group consisting of dodecyl, tridecyl and tetradecyl glycidyl ethers, a polar compound and at least one thixotropic material; mixing the said first composition with a second composition containing an amine-glycidyl adduct formed by the reaction of two moles of a heterocyclic spiro diamine represented by the formula:

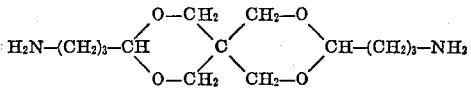

with one mole of butyl glycidyl ether to form a potting compound; delivering said compound to a space to be potted; and allowing the potting compound to cure.

In accordance with the present invention, a novel low toxicity potting formulation, which meets all of the exacting criteria required of a room temperature cure end sealant, is provided by the combined use of a particular minimum irritation potential curing agent and a particular minimum irritation potential reactive diluent. Use of the reactive diluent specified hereinafter is not essential but is preferred. Through proper selection of one or more thixotropic materials, polar compounds, and fillers where used, and by proper proportioning of the various components, the potting formulation of this invention has a high shear viscosity of about 3,500 to 4,000 centipoises and a thixotropic index of between about 2.25 and about 2.50 to 1, each in the desired range. Moreover, the potting produced from this compound has the proper degree of adhesiveness and flexibility to resist thermal shock, yet is dimensionally stable under normal service conditions.

In the practice of the present invention, two separate compositions are preferably prepared initially. Intermixture of these two compositions produces the potting compound of the invention which, upon curing, produces the potting of the invention.

Typically, the first composition contains a low foaming glycidyl ether of bisphenol A having a viscosity of between about 7,000 and 9,000 centipoises, an alkyl glycidyl ether, a polar compound, a thixotrope and a filler. Normally this composition also contains a pigment. The second composition contains the curing agent or agents. These two compositions are then mixed, just prior to application to the space to be potted. It will be understood by those skilled in the art, however, that certain obvious modifications could be made in the manner of preparing the potting compound without departing from the scope of the present invention. Thus, the potting compound formulation could be prepared from more than two submixtures or could be prepared by directly mixing all of the constituent components; provided, of course, that any mixtures which contain both the glycidyl ether and curing agent components must be delivered to the space to be potted relatively quickly, before substantial curing takes place.

The glycidyl ether of bisphenol A is the basic constituent of the epoxy potting compound of this invention. Preferably it should have a weight per epoxide group of between about 160 and about 200, and a vicosity of between about 7,000 and about 16,000 centipoises. Such polyfunctional epoxides are available from numerous sources such as, for example, the epoxy compounds sold under the trade name "ERL 2200" by Union Carbide Corporation, "D.E.R. 331" by Dow Chemical Co., "Epon 828" by Shell Chemical Co., "Araldite 6010" by Ciba Products Co., "Epi-Rez 510" by Celanese Coating Co., "Epotuf 37–150" by Reichhold Chemicals, Inc., "Gen-Epoxy 190" by General Mills, Inc., and "Tipox B" by Thiokol Chemical Co. It will be understood that other epoxy compounds of this type may also be used in practicing the invention. In the preferred form of this invention, as above noted, the glycidyl ether of bisphenol A is first mixed with the reactive diluent, filler, thixotrope and polar compound to form a first composition, referred to hereinafter as the crude epoxy composition. The crude epoxy composition should contain at least about 50% and not more than 90%, preferably about 65% by weight, of the glycidyl ether of bisphenol A.

The reactive diluent is an optional component of the potting formulation of this invention, but its inclusion is strongly preferred since it not only assists in reducing the viscosity of the formulation while building up the mixture thixotropy, but also in improving wettability of the formulation and thereby the adhesion of the cured potting to an adjacent surface such as the inside wall of a motor protector. In applications where the potting formulation is dispensed through small bore needles and high production rates are required, the reactive diluent is an essential component of the formulation. The various dodecyl, tridecyl and tetradecyl glycidyl ethers serve effectively in reducing viscosity and improving wettability of the potting formulation without increasing its toxicity. These compounds carry a Society of the Plastics Industry toxicity rating of class 2, i.e., the product will only produce irritation of the skin following prolonged or frequent contact, compared to the class 4 rating, i.e., "strong sensitizer," carried by the reactive diluents conventionally used in epoxy potting compounds. The reactive diluent may also contain pentadecyl and higher glycidyl ethers, provided that the proportions of such components are not so high as to significantly increase the viscosity or reduce the melting point of the diluent. Even minor amounts of undecyl, or shorter chain, glycidyl ethers may be tolerated in the diluent, but excessive proportions of short chain ethers must be avoided to maintain minimum irritation potential. The preferred reactive diluent comprises a mixture whose principal constituents are n-dodecyl glycidyl ether and n-tetradecyl glycidyl ether, such as that sold under the trade name "Epoxide 8" by Procter & Gamble Co. This particular diluent has an epoxy equivalent weight of between 264 and 308, a specific gravity of 0.89 and a viscosity of about 8.5 centipoises (at 25° C.). The crude epoxy composition preferably contains between about 7% and 18%, most preferably about 11%, by weight of the reactive diluent, based on the amount of the glycidyl ether of bisphenol A present. Relatively low proportions of the reactive diluent should be used where the quantity of filler used is low. Where high production rate is of less concern or where adhesion problems are not severe, the reactive diluent may be omitted entirely from the composition.

The filler is an optional component, but is preferably used in order to lower the cost of the potting compound, to reduce the shrinkage on cure, to absorb heat generated during curing and to reduce the coefficient of thermal expansion of the potting, thus improving its resistance to thermal shock. The filler may constitute up to about 30% of the crude epoxy composition. Though moderate amounts of filler improve thermal shock characteristics by reducing thermal expansion, use of too much filler reduces the flexibility of the potting and adversely affects thermal shock resistance. Thus, if the crude epoxy composition contains substantially more than 30% filler, resistance of the potting to thermal shock significantly suffers. Any filler may be used which is compatible with epoxy resin systems and does not adversely affect the electrical, adhesive or other properties of the potting. The preferred filler for the compositions of this invention is oven dried 99.7% crystalline silica having a pH of 8–9, fine ground and screened so that 98.5% of its particles pass a 325 mesh screen, approximately 75% of its constituent particles are smaller than about 13 microns, and approximately 29.0% of its particles are smaller than 2 microns. A filler of this nature is sold under the trade name "#219 crystalline silica sand" by Whittaker, Clark & Daniels of New York, New York. Other useful fillers include, for example, clays, talc, calcium carbonate, flint powder, quartz, lithium aluminum silicate, mica, alumina, and wollastonite.

Those conventional thixotropic agents and combinations thereof, which are compatible with epoxy resin systems and with the adhesive properties of potting, may be used in appropriate quantities to impart the desired 2 to 3, preferably 2.25 to 2.50 to 1 thixotropic index to the potting compound formulation of this invention. The thixotropic index is determined by the ratio of the viscosity at 3 r.p.m. to the viscosity at 30 r.p.m., as measured on a Brookfield LVT viscometer, spindle No. 4. A preferred thixotropic material is a combination of pyrogenic colloidal silica, 99.8% $SiO_2$ minimum, moisture free basis, having a primary particle size of 0.010 to 0.040 micron, and a surface area of 200±25 sq. m./g., such as that sold under the trade name "Cab-O-Sil M5" by the Cabot Corp., and defibrillated hydrated acicular magnesium silicate asbestos, whose constituent fibers are 200 to 300 angstroms in diameter by 4,000 to 5,000 angstroms long, such as that sold under the trade name "Avibest C" by FMC Corp., in the ratio of about three parts of silica to one part asbestos. Where this preferred combination constitutes the thixotrope, the crude epoxy composition should contain at least about 0.80% by weight pyrogenic silica. The minimum concentration of pyrogenic silica also represents the preferred concentration thereof. Combinations of colloidal silica and hydrated acicular magnesium silicate asbestos in other proportions may also be employed as the thixotrope and each may be utilized by itself. Pyrogenic colloidal silica concentrations up to about 2% by weight of the crude epoxy composition may be used, as may hydrated acicular magnesium silicate asbestos concentrations up to about 1.1%. Though not preferred, other thixotropes such as precipitated colloidal silica, bentonites, organic derivatives of bentonites such as methyldioctadecyl ammonium bentonite, and silica aerogels may also be used.

Thixotropic properties are imparted to the potting composition by the formation of a "chicken wire" type lattice of thixotrope particles when the formulation is at rest, and the dissipation of this lattice under high shear conditions. If a polar compound is present in the formulation, hydrogen bonding can occur between the thixotrope particles, greatly increasing the integrity of the thixotrope lattice while the material is at rest and consequently increasing the thixotropic index. To achieve the degree of thixotropy required by formulations of the present invention, it is necessary that such a polar compound be included. Any compatible nonvolatile hydroxy compound may be used for this purpose with glycols and triols being preferred. Esters such as polyethylene glycol monolaurate or dilaurate may also be used. A particularly preferred polar compound is glycerol. The polar compound should be present in at least stoichiometric equivalence to the thixotrope. A larger proportion of polar compound can be tolerated but is unnecessary since excess polar compound is a nonreactive contaminant. Too large an excess can be detrimental to the properties of the potting. Normally there is no need to employ more than about 1% by weight of the polar compound based on the quantity of crude epoxy composition used in the formulation, and the preferred crude epoxy composition of this invention contains about 0.2% of glycerol.

As noted above, epoxy type potting is usually pigmented. Conveniently, a small amount of a pigment such as carbon black or iron oxide is incorporated in the crude epoxy composition. In the preferred embodiment of this invention, the crude epoxy composition contains approximately 1% of carbon black.

To produce the epoxy formulation of this invention, the crude epoxy composition is mixed with amine curing agents or hardeners. This formulation cures into potting on reaction of the hardener with the epoxy components to produce a cross-linked polymeric structure. The hardeners employed in this invention, as contrasted to the hardeners commonly used for room temperature cure epoxy potting, possess minimum toxicity characteristics, in particular, minimum irritation potential for skin.

The principal curing agent used in the potting compound of this invention is an amine-monofunctional glycidyl ether adduct formed by the reaction (at approximately 50° C. for about three hours) of two moles of a heterocyclic spiro diamine represented by the formula:

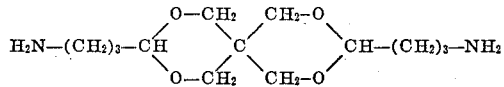

with one mole of butyl glycidyl ether, the adduct having an average molecular weight of about 340, an active hydrogen equivalent weight of between about 85 and 105, a specific gravity of about 1.10 at 68° F. and a viscosity of about 2,600 centipoises at 77° F. Such an amine adduct hardener is sold commercially by the Ajinomoto Co. under the trade name "Ajicure B002."

At least about 70% by weight of the hardener should consist of "Ajicure B002." Though "Ajicure" alone may serve as the curing agent, up to about 15% by weight of the hardener composition may be constituted by various "safety hardeners" such as the various ethylene oxide and propylene oxide adducts of diethylene triamine and triethylene tetramine. Typical curing agents of this class include N,N'-bis(hydroxyethyl) diethylene triamine, N-(hydroxyethyl) diethylene triamine, N-(2-phenyl-2-hydroxyethyl) diethylene triamine, N-(hydroxypropyl) diethylene triamine, N,N'-bis(hydroxyethyl) triethylene tetramine, N,N'-bis(hydroxylpropyl) diethylene triamine, N,N'-tris(hydroxyethyl) diethylene triamine, N,N'-tris(hydroxypropyl) diethylene triamine, and N-(2-hydroxy-2,4,4-trimethyl pentyl) diethylene triamine. A particularly preferred hardener composition consists of about 86% by weight "Ajicure," about 12% by weight N-(hydroxyethyl) diethylene triamine and about 2% by weight N,N'-bis(hydroxyethyl) diethylene triamine. The hardener is normally used in an amount sufficient to be stoichiometrically equivalent to the reactive epoxy groups in the crude epoxy composition, though some variation from stoichiometric equivalence may be tolerated. By way of example, 100 parts by weight of a preferred crude epoxy composition, consisting of about 64.0 parts by weight of a glycidyl ether of bisphenol A, 11.3 parts by weight of a mixture of n-dodecyl and n-tetradecyl glycidyl ether, 1.0 part by weight of carbon black pigment, 22.6 parts by weight of a 99.7% crystalline silica filler, 0.72 part by weight pyrogenic silica, 0.19 part by weight defibrillated hydrated acicular magnesium silicate asbestos, and 0.19 part by weight glycerol, is preferably mixed with 35 parts by weight of a hardener composition consisting of about 86% by weight "Ajicure B002," about 12% by weight of N-(hydroxyethyl) diethylene triamine and about 2% by weight of N,N'-bis(hydroxyethyl) diethylene triamine to form the potting compound of this invention. Satisfactory potting may be prepared, however, by mixing as little as about 25 parts by weight or as much as about 45 parts by weight of the above hardener with 100 parts by weight of the above crude epoxy composition.

In accordance with the process of this invention, a potting compound of the above described type is prepared. Though, as noted, there is a significant degree of flexibility in the manner of preparing the potting compound, it is preferably produced by first preparing a crude epoxy composition containing the glycidyl ether of bisphenol A, the minimum irritation potential reactive diluent, the thixotrope, polar compound, filler and pigment, and then mixing this crude epoxy composition with a stoichiometrically equivalent amount of the hardener. When incorporating the thixotropic material, high shear conditions should be maintained for an extended period, e.g., 30 minutes, to assure proper dispersion. During this period the polar compound should be kept out of the mixture. Once good dispersion has been achieved, the polar compound is added and high shear mixing continued for about five more minutes. This latter period of high shear should not be substantially exceeded or the thixotropic properties of the formulation will begin to be lost. Typical of the high shear equipment useful in incorporating thixotropic materials are dispersers such as the Cowles dissolver. If a crude epoxy composition is to be stored for a significant period of time before use, the temperature is preferably maintained at an elevated temperature, e.g., 150° F., for the first 24 hours or so. Initial storage at elevated temperature stabilizes the formulation and avoids subsequent changes of neological properties which may otherwise be suffered.

To assist in control of viscosity, it may be advantageous to leave a small proportion of the alkyl glycidyl ether out of the formulation initially, adding it in an amount sufficient to adjust viscosity just prior to use. Degassing of the crude epoxy compound is also desirable before use so as to minimize the incidence of voids in the cured potting. Degassing may conveniently be accomplished by simply subjecting the crude epoxy composition to a high vacuum, e.g., 29½ inches of mercury, until the foam head generated by escaping gas collapses, and for a short period, e.g., about two minutes, thereafter.

The pot life of my preferred formulation, after mixing of the crude epoxy composition with the hardener, is sufficient to permit 108 grams, initially at 75° F. in a collapsible tube lined brass cylinder to flow uniformly through a small nozzle for a duration of 30 minutes following combination of the coreactants. Consequently, within less than about thirty minutes after it is prepared, the potting compound should be delivered to the space to be potted, for example, the open end of a motor protector assembly. Delivery of the potting compound may be accomplished in any convenient manner, but is preferably carried out by injection into the desired space by use of a small bore needle. After injection, the potting compound is allowed to cure at room temperature for several hours, for example, about twelve hours. Curing is then completed by heating the potting to a temperature of between about 200° F. and about 275° F. for a period of about two hours. The resulting potting adheres strongly to surrounding surfaces including those coated with nickel or with tin or other soft metals, with which it is normally difficult to obtain a tenacious bond. The potting also has sufficient flexibility to maintain its integrity under severe thermal shock, yet sufficient rigidity to maintain dimensional stability in normal service.

As noted, the potting of this invention is particularly effective for such purposes as end sealing of a motor protector. Very high production rates may be achieved in applying the potting compound and the potting is possessed of excellent properties, yet the process operator is exposed to minimum skin irritation.

Because of its relatively low viscosity (3,500 to 4,000 cenipoises) under high shear conditions, my preferred potting compound can be readily dispensed through a small bore needle, for example of 0.050" inside diameter needle, and rapidly fill the end of the motor protector tube. Because of its high thixotropic index, however, the potting compound remains in the tube end and does not seep through the gap between the ceramic spacer and the tube.

After about twelve hours of curing at between 70° and 80° F., the potting has cured sufficiently that it may be heated to 200° F. or higher without being penetrated or significantly distorted by air entrapped in the tube, whose pressure rises to approximately 3.5 p.s.i.g. at 200° F. Curing is completed by maintaining the potting at the latter temperature for about two hours.

The potting which results from curing adheres strongly to the walls of the motor protector tube which are normally tin plated. Thermal shock resistance of the final end seal is very good. The integrity of the seal is fully maintained when the stator to which the motor protector is attached is dipped in varnish after a prebake at 350° F. Integrity of the seal is further demonstrated by dipping it in red dye penetrant, comprising a very low viscosity mixture of kerosene and toluene, immediately after heating the motor protector to 350° F. Though the potting is sufficiently flexible to provide such resistance to thermal shock, it is rigid enough to prevent the thermal switch terminals projecting through it from moving more than 0.001" due to contact forces or thermal stresses. This property is indicated by hardness tests run using a Barcol GYZJ 935 Impressor at 77° F. wherein the potting of this invention gives an initial reading of 70 and a minimum of 65 after 10 seconds.

The following examples illustrate the invention:

EXAMPLE 1

The following materials in indicated quantities were used to prepare a crude epoxy composition:

Parts by weight
A low foaming glycidyl ether of bisphenol A having a weight per epoxide of 175-185, specific gravity 1.15-1.17 and viscosity at 25° C. of 7,000 to 9,000 centipoises (sold under the trade name ERL 2200 by the Union Carbide Corporation) _____ 64.0
An alkyl glycidyl ether mixture consisting predominantly of n-dodecyl and n-tetradecyl glycidyl ethers having a weight per epoxide of 264-308, specific gravity 0.89 and viscosity at 25° C. of 8.5 centipoises (sold under the trade name "Epoxide 8" by Procter & Gamble Company) ____ 11.3
A 20% oil furnace carbon black, nigrometer scale 90, surface area 85 sq. m./g., particle diameter 29 microns (sold under the trade name "Elftex 8" by the Cabot Corporation) finely dispersed by 3 roll mill into medium viscosity glycidal ether of bisphenol A epoxy having a weight per epoxide of 172 to 200 _____ 1.0
Oven dried 99.7% crystalline silica, fine ground and screened sieve fineness 98.5% through 325 mesh pH 8-9, particle size 74.8% less than 13 microns, 29.0% less than 2 microns (sold under the trade name "No. 219 crystalline silica sand" by Whittaker, Clark & Daniels of New York, N.Y.) ____ 22.6
Pyrogneic silica thixotrope 99.8% $SiO_2$ minimum, moisture free basis; primary particle size .010-.040 micron, surface area 200±25 sq. m./g. (sold under the trade name "Cab-O-Sil M5" by Cabot Corporation) _____ 0.72
Defibrillated hydrated acircular magnesium silicate asbestos 200-300 angstroms diameter by 4,000-5,000 angstroms long (sold under the trade name "Avibest C" by FMC Corporation) _____ 0.19
96% synthetic glycerine _____ 0.19

In preparing a crude epoxy composition from these materials, the glycidyl ether or bisphenol A, the alkyl glycidyl ether and the pigment were initially blended at moderate speed in a Cowles dissolver for a period of about one minute. The speed of the dissolver was then briefly reduced to allow charging of the crystalline silica, the pyrogenic silica thixotrope, and the defibrillated asbestos. After the latter materials had been added, the disperser was operated at high speed and high shear for about 30 minutes to fully incorporate the filler and thixotropic material. The disperser speed was again lowered to allow the glycerine to be charged, after which the speed was increased to provide high shear for an additional 5 minutes. The resulting crude epoxy composition was subjected to a vacuum of 29½ inches of mercury until the head of foam forming on the surface of the liquid had collapsed, and for an additional 2 minutes thereafter. This crude epoxy composition had a viscosity of 85-125 poises, Brookfield viscometer LVT, speed 30 r.p.m., Spindle 4, at 25° C.

A hardener composition was prepared from the following materials in the indicated proportions:

Percent by weight
An amine-monofunctional glycidyl ether adduct formed by the reaction of two moles of a heterocyclic spiro diamine with one mole of butyl glycidyl ether (sold commercially by the Ajimonto Co. under the trade name "Ajicure B002") ____ 85.75
N,N'-bis (hydroxyethyl) diethylene triamine [1] ___ 2.14
N-(hydroxyethyl) diethylene triamine [1] _____ 12.11

[1] Sold commercially by Ciba Products Co. under the trade name of Araldite 956.

35 parts of the hardener composition were mixed with 100 parts of the crude epoxy composition to form a potting compound. The potting compound was charged to a metal cylinder lined with a soft metal disposable tube having a small diameter discharge nozzle. A cap was screwed on the metal cylinder and air was introduced through a solenoid valve into the cylinder, forcing the resin through the dispensing nozzle and into the end space of a tinned motor protector. The formulation was dispensed at a rate such that the potting area was rapidly filled without trapping air voids.

After the end of the motor protector was filled, the potting compound was allowed to cure at a temperature of 75° F. for a period of about 12 hours. The temperature was then raised to 200° F. for about 2 hours to complete the curing process.

After curing, the potting exhibited a minimum initial hardness reading of 70 and a reading after 10 seconds of 65 on a Barcol GVZJ 935 depressor at 77° F.

To test the integrity of the end seal provided by the potting, the motor protector was baked in an oven at 350° F. for 15 minutes and then dipped in a mixture of toluene and kerosene containing a red dye. Thed yed solvent failed to penetrate the potting, indicating that a hermetic seal was maintained.

EXAMPLE 2

A crude epoxy composition was prepared from the indicated amounts of the following materials, in accordance with the method described in Example 1.

Parts by weight
"ERL 2200" _____ 75
"Elftex 8" epoxy paste _____ 1
"No. 219 crystalline silica sand" _____ 23
"Cab-O-Sil M5" _____ 0.7
"Avibest C" _____ 0.15
Glycerol _____ 0.15

100 parts of this crude epoxy composition were mixed with 42.4 parts of the hardener composition of Example 1, and applied to the end of a motor protector in accordance with the method of Example 1. A dimensionally stable, thermal shock resistant, hermetic end seal was provided.

EXAMPLE 3

A crude epoxy composition was prepared from the indicated amounts of the following materials, in accordance with the method described in Example 1.

| | Parts by weight |
|---|---|
| "ERL 2200" | 62.4 |
| "Epoxide 8" | 13.7 |
| "Elftex 8" epoxy paste | 1.0 |
| "No. 219 crystalline silica sand" | 21.5 |
| "Cab-O-Sil M5" | 1.00 |
| "Avibest C" | 0.20 |
| Glycerol | 0.20 |

100 parts of this crude epoxy composition were mixed with 35.7 parts of the hardener composition of Example 1, and applied to the end of a motor protector in accordance with the method of Example 1. A dimensionally stable, thermal shock resistant, hermetic end seal was provided.

EXAMPLE 4

A crude epoxy composition was prepared from the indicated amounts of the following materials, in accordance with the method described in Example 1.

| | Parts by weight |
|---|---|
| A low foaming glycidyl ether of bisphenol A having a weight per epoxide of 185–192, specific gravity 1.16–1.18 and viscosity at 25° C. of 10,000–16,000 centipoises (sold under the trade name "Epon 828V" by Shell Chemical Co.) | 90 |
| "Epoxide 8" | 7.2 |
| "Cab-O-Sil M5" | 2 |
| "Avibest C" | 0.4 |
| Glycerol | 0.4 |

100 parts of this crude epoxy composition were mixed with 40.4 parts of the hardener composition of Example 1, and applied to the end of a motor protector in accordance with the method of Example 1. A dimensionally stable, thermal shock resistant, hermetic end seal was provided.

EXAMPLE 5

A crude epoxy composition was prepared from the indicated amounts of the following materials, in accordance with the method described in Example 1.

| | Parts by weight |
|---|---|
| "ERL 2200" | 63 |
| "Epoxide 8" | 10 |
| "Elftex 8" epoxy paste | 1 |
| Calcium carbonate (sold under the trade name "Carbium" by Diamond Alkali Co.) | 25 |
| "Cab-O-Sil M5" | 0.7 |
| "Avibest C" | 0.15 |
| Glycerine | 0.15 |

100 parts of this crude epoxy composition were mixed with 39.2 parts of the hardener composition of Example 1, and applied to the end of a motor protector in accordance with the method of Example 1. A dimensionally stable, thermal shock resistant, hermetic end seal was provided.

EXAMPLE 6

A crude epoxy composition was prepared from the indicated amounts of the following materials, in accordance with the method described in Example 1.

| | Parts by weight |
|---|---|
| "ERL 2200" | 64 |
| "Epoxide 8" | 11 |
| "Elftex 8" epoxy paste | 1 |
| "No. 219 crystalline silica sand" | 22.8 |
| "Cab-O-Sil M5" | 1.0 |
| Glycerol | 0.20 |

100 parts of this crude epoxy compositions were mixed with 39 parts of the hardener composition of Example 1, and applied to the end of a motor protector in accordance with the method of Example 1. A dimensionally stable, thermal shock resistant, hermetic end seal was provided.

EXAMPLE 7

A crude epoxy composition was prepared from the indicated amounts of the following materials, in accordance with the method described in Example 1.

| | Parts by weight |
|---|---|
| "ERL 2200" | 64 |
| "Epoxide 8" | 11 |
| "Elftex 8" | 1 |
| "No. 219 crystalline silica sand" | 23.4 |
| "Avibest C" | 0.50 |
| Glycerol | 0.10 |

100 parts of this crude epoxy composition were mixed with 39 parts of the hardener composition of Example 1, and applied to the end of a motor protector in accordance with the method of Example 1. A dimensionally stable, thermal shock resistant, hermetic end seal was provided.

EXAMPLE 8

A crude epoxy composition was prepared from the indicated amounts of the following materials, in accordance with the method described in Example 1.

| | Parts by weight |
|---|---|
| "ERL 2200" | 64 |
| "Epoxide 8" | 11.3 |
| "Elftex 8" epoxy paste | 1 |
| "No. 219 crystalline silica sand" | 22.7 |
| "Cab-O-Sil M5" | 0.70 |
| "Avibest C" | 0.15 |
| Ethylene glycol | 0.15 |

100 parts of this crude epoxy composition were mixed with 38.9 parts of the hardener composition of Example 1, and applied to the end of a motor protector in accordance with the method of Example 1. A dimensionally stable, thermal shock resistant, hermetic end seal was provided.

EXAMPLE 9

The crude epoxy composition of Example 1 was mixed with a stoichiometric equivalent of 100% "Ajicure B002" and used to end seal a motor protector in accordance with the method described in Example 1. A dimensionally stable, thermal shock resistant, hermetic seal was provided.

EXAMPLE 10

The crude epoxy composition of Example 1 was mixed with a stoichiometric equivalent of 66⅔% "Ajicure B002" and 33⅓% "Araldite 956" and used to end seal a motor protector in accordance with the method described in Example 1. A dimensionally stable, thermal shock resistant, hermetic seal was provided.

What is claimed is:

1. A method for preparing a low toxicity composition useful for a potting composition which comprises the steps of forming a first composition by mixing a first preselected amount between about 50% and about 90% by weight of glycidyl ether of bisphenol A having a viscosity not substantially higher than about 16,000 centipoises at 25° C. and a weight per epoxide of between about 160 and about 200, a second preselected amount between about 7% and about 18% by weight of at least one reactive diluent selected from the group consisting of dodecyl glycidyl ether, tridecyl glycidyl ether and tetradecyl glycidyl ether, a third preselected amount by weight of a hydroxy polar compound and sufficient thixotropic material of the type compatible with epoxy resin systems to impart a thixotropic index of between about 2 and about 3 to an approximately stoichiometric mixture of the said composition with a curing agent therefor, said third preselected amount of the hydroxy polar compound being present in at least stoichiometric equivalence to the thixotropic material mixing for each 100 parts by weight of said first composition a second low toxicity composition of between about 25 and about 45 parts by weight containing an amine-monofunctional glycidyl ether adduct, at least about 70% by weight formed by the reaction of two moles of a heterocyclic spiro diamine represented by the formula:

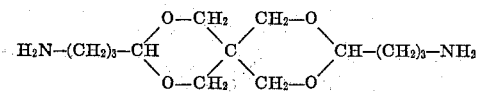

with one mole of butyl glycidyl ether.

2. A low toxicity composition made in accordance with claim 1.

3. A method for preparing a low toxicity composition as set forth in claim 1 including the addition of up to about 30% by weight of a filler compatible with epoxy resin potting systems.

4. A cured potting compound which comprises a mixture of a thixotropic material sufficient to impart to the compound a thixotropic index of between about 2 and about 3 to 1 of the type compatible with epoxy resin systems, a hydroxy polar compound in at least stoichiometric equivalence to the thixotropic material, and the reaction product between a first composition of low toxicity containing glycidyl ether of bisphenol A between about 50% and about 90% by weight having a viscosity not higher than about 16,000 centipoises, and a weight per epoxide of between about 160 and about 200, a reactive diluent between about 7% and about 18% by weight comprising at least one compound selected from the group consisting of dodecyl glycidyl ether, tridecyl glycidyl ether and tetradecyl glycidyl ether and a second composition of low toxicity containing an amine-monofunctional glycidyl ether adduct, at least about 70% by weight formed by the reaction of two moles of a heterocyclic spiro diamine represented by the formula:

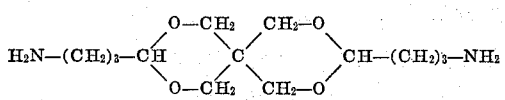

with one mole of butyl glycidyl ether, the potting compound comprising between about 25 and about 45 parts by weight of the second composition for each 100 parts by weight of the first composition, thixotropic material and polar compound.

5. A cured potting compound as set forth in claim 4 wherein the said second low toxicity composition also contains at least one material selected from the group consisting of N-hydroxyethyl and N-hydroxypropyl diethylene triamines, N-hydroxyethyl and N-hydroxypropyl triethylene tetramines, N-(2-phenyl - 2 - hydroxyethyl) diethylene triamine, and N-(2-hydroxy - 2,4,4 - trimethyl pentyl) diethylene triamine.

6. A cured potting compound as set forth in claim 5 wherein the said second low toxicity composition contains at least about 85% by weight of an amine-monofunctional glycidyl ether adduct formed by the reaction of two moles of a heterocyclic spiro diamine represented by the formula:

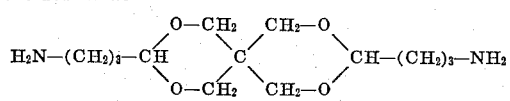

with one mole of butyl glycidyl ether.

7. A cured potting compound as set forth in claim 4 wherein the said thixotropic material comprises at least one thixotrope selected from the group consisting of colloidal silica, silica aerogel, bentonite, trialkyl ammonium bentonite, and defibrillated hydrated magnesium silicate asbestos.

8. A cured potting compound as set forth in claim 4 wherein the said polar compound is selected from the group consisting of glycols, triols, and esters thereof.

9. A cured potting compound as set forth in claim 7 wherein the said thixotropic material comprises a mixture of colloidal silica and defibrillated hydrated magnesium silicate asbestos whose constituent fibers are between about 200 and about 300 angstroms in diameter and between about 4,000 and about 5,000 angstroms long.

10. A cured potting compound as set forth in claim 4 which additionally contains a filler of up to about 30% by weight of the first composition, thixotropic material and polar compound, compatible with epoxy resin potting systems.

11. A cured potting compound as set forth in claim 4 wherein the said first low toxicity composition contains between about 50% and 90% by weight of the glycidyl ether of bisphenol A, between about 7% and about 18% by weight of the reactive diluent based on the amount of glycidyl ether of bisphenol A present, between about 0.1% and about 2% by weight of the polar compound and between about 1% and about 3% by weight of the thixotropic material and the said second low toxicity composition contains at least about 85% by weight of an amine-monofunctional glycidyl ether adduct formed by the reaction of two moles of a heterocyclic spiro diamine represented by the formula:

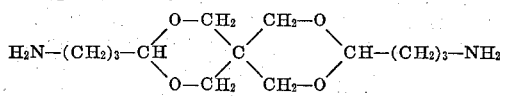

with one mole of butyl glycidyl ether and the remainder ethylene oxide or propylene oxide adducts of diethylene triamine or triethylene tetramine.

12. A cured potting compound as set forth in claim 11 wherein the said first low toxicity composition additionally contains up to about 30% by weight of a filler.

13. A method for preparing potting without substantial exposure of personnel to toxicity which comprises the steps of
(a) preparing a first low toxicity composition by mixing between about 50% and about 90% by weight of a glycidyl ether of bisphenyl A having a viscosity of not higher than about 16,000 centipoises and a weight per epoxide of between about 160 and about 200, between about 7% and about 18% by weight of at least one reactive diluent, the major portion selected from the group consisting of dodecyl glycidyl ether, tridecyl glycidyl ether and tetradecyl glycidyl ether, and at least one thixotropic material sufficient to impart a thixotropic index to the potting between about 2 and about 3 to 1, the said thixotrope being incorporated in the mixture under high shear conditions;
(b) adding a hydroxy polar compound in at least stoichiometric equivalence to the thixotropic material to the mixture and subjecting the mixture to high shear for a period of not substantially greater than about 5 minutes;
(c) mixing for each 100 parts by weight of said first composition including the polar compound with a second low toxicity composition of between about 25 and about 45 parts by weight of said second composition containing an amine-monofunctional glycidyl ether adduct of at least about 70% by weight of said second composition formed by the reaction of two moles of a heterocyclic spiro diamine represented by the formula:

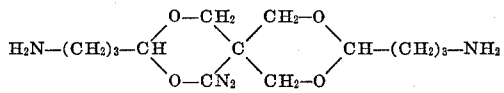

with one mole of butyl glycidyl ether to form a potting compound;

(d) delivering said compound to a space to be potted; and (e) allowing the potting compound to cure.

14. The method set forth in claim 13 wherein the said thixotropic material comprises at least one thixotrope selected from the group consisting of colloidal silica, silica aerogel, bentonite, trialkyl ammonium bentonite, and defibrillated hydrated magnesium silicate asbestos.

15. The method set forth in claim 14 wherein the said thixotropic material comprises a mixture of colloidal silica and defibrillated hydrated magnesium silicate asbestos whose constituent fibers are between about 200 and about 300 angstroms in diameter and between about 4,000 and about 5,000 angstroms long.

16. The method set forth in claim 13 wherein the said polar compound is selected from the group consisting of glycols, triols, and esters thereof.

17. The method set forth in claim 13 wherein the said first low toxicity composition additionally contains a filler of up to about 30% by weight of the first composition compatible with epoxy resin systems.

18. The process set forth in claim 17 wherein curing is completed at a temperature of between about 200° F. and about 275° F.

19. The method set forth in claim 13 wherein the said first low toxicity composition contains between about 50% and 90% by weight of the glycidyl ether of bisphenol A, between about 7% and about 18% by weight of the reactive diluent based on the amount of glycidyl ether of bisphenol A present, between about 0.1% and about 2% by weight of the polar compound and between about 1% and about 3% by weight of the thixotropic material and the said second low toxicity composition contains at least about 85% by weight of an amine-monofunctional glycidyl ether adduct formed by the reaction of two moles of a heterocyclic spiro diamine represented by the formula:

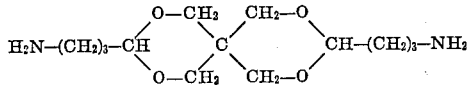

with one mole of butyl glycidyl ether.

20. A cured potting compound which comprises a mixture of a thixotropic material sufficient to impart to the compound a thixotropic index of between about 2 and about 3 to 1 of the type compatible with epoxy resin systems, a hydroxy polar compound in at least stoichiometric equivalence to the thixotropic material, and the reaction product between a first composition of low toxicity containing glycidyl ether of bisphenol A between about 50% and about 90% by weight having a viscosity not higher than about 16,000 centipoises, and a weight per epoxide of between about 160 and about 200, and a second composition of low toxicity containing at least about 66⅔% by weight of an amine-monofunctional glycidyl ether adduct formed by the reaction of two moles of a heterocyclic spiro diamine represented by the formula:

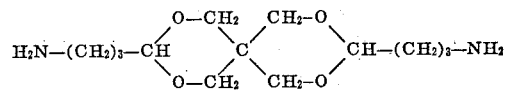

with one mole of butyl glycidyl ether, the said second low toxicity composition also containing at least one material selected from the group consisting of N-hydroxyethyl and N-hydroxypropyl diethylene triamines, N-hydroxyethyl and N-hydroxypropyl triethylene tetramines, N-(2-phenyl - 2 - hydroxyethyl) diethylene triamine, and N-(2-hydroxy - 2,4,4, - trimethyl pentyl) diethylene triamine, the potting compound comprising between about 25 and about 45 parts by weight of the second composition for each 100 parts by weight of the first composition, thixotropic material and polar compound.

References Cited

UNITED STATES PATENTS

| | | | |
|---|---|---|---|
| 2,735,829 | 2/1956 | Wiles et al. | 260—30.4 Ep X |
| 3,367,911 | 2/1968 | Daum et al. | 260—30.4 Ep X |

FOREIGN PATENTS

| | | | |
|---|---|---|---|
| 684,415 | 4/1964 | Canada | 260—37 Ep |
| 674,618 | 11/1963 | Canada | 260—37 Ep |

OTHER REFERENCES

Lee et al.; Epoxy Resins; McGraw-Hill Book Co., Inc. 1957; pp. 70, 75–79, and 84–88; Sci. Lib., TP 986.E6 L4.

Lee et al.; Handbook of Epoxy Resins; McGraw-Hill Book Co., Inc.; 1967; pp. 13–10, 14–4 and 14–6; Sci. Lib., TP 1180.E6 L4.

LEWIS T. JACOBS, Primary Examiner

U.S. Cl. X.R.

260—2 EN, 37 EP, 47 EN